United States Patent
Gueron

(10) Patent No.: US 9,800,406 B2
(45) Date of Patent: Oct. 24, 2017

(54) TECHNOLOGIES FOR MODIFYING A FIRST CRYPTOGRAPHIC CIPHER WITH OPERATIONS OF A SECOND CRYPTOGRAPHIC CIPHER

(71) Applicant: Intel Corporation, Santa Clara, CA (US)

(72) Inventor: Shay Gueron, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 296 days.

(21) Appl. No.: 14/283,955

(22) Filed: May 21, 2014

(65) Prior Publication Data

US 2015/0341168 A1 Nov. 26, 2015

(51) Int. Cl.
*H04L 9/08* (2006.01)
*H04L 9/14* (2006.01)
*H04L 9/06* (2006.01)

(52) U.S. Cl.
CPC .............. *H04L 9/0838* (2013.01); *H04L 9/06* (2013.01); *H04L 9/14* (2013.01); *H04L 2209/24* (2013.01)

(58) Field of Classification Search
CPC . H04L 9/0838; H04L 9/06; H04L 9/14; H04L 9/16; H04L 2209/24
See application file for complete search history.

(56) References Cited

U.S. PATENT DOCUMENTS

| | | |
|---|---|---|
| 2002/0191784 A1 | 12/2002 | Yup et al. |
| 2005/0207571 A1 * | 9/2005 | Ahn ...................... H04L 9/003 380/28 |
| 2007/0071236 A1 * | 3/2007 | Kohnen ................ H04L 9/0631 380/29 |
| 2008/0112560 A1 * | 5/2008 | Koo ....................... H04L 9/0631 380/29 |
| 2009/0161864 A1 | 6/2009 | Lee et al. |
| 2009/0172068 A1 | 7/2009 | Kounavis et al. |

(Continued)

FOREIGN PATENT DOCUMENTS

| TW | 200845689 A | 11/2008 |
|---|---|---|
| TW | 201105080 A | 2/2011 |

OTHER PUBLICATIONS

"Streaming SIMD Extensions" Wikipedia article dated Mar. 21, 2014 (3 pages) https://en.wikipedia.org/w/index.php?title=Streaming_SIMD_Extensions&oldid=600620396.*

(Continued)

*Primary Examiner* — Darren B Schwartz
*Assistant Examiner* — Thomas Gyorfi
(74) *Attorney, Agent, or Firm* — Grossman, Tucker, Perreault & Pfleger, PLLC

(57) ABSTRACT

Generally, the present disclosure provides technology modifying a first cryptographic cipher with one or more operations of a second cryptographic cipher. In some embodiments the technology leverages a mathematical relationship between representations of data used in the first and second ciphers to enable the substitution of one or more operations of the first cipher with one or more operations of the second cipher. The resulting modified cipher may in some instances exhibit improved performance and/or security, relative to the unmodified first cipher. Methods, computer readable media, and apparatus including or utilizing the technologies are also described.

25 Claims, 5 Drawing Sheets

(56) References Cited

U.S. PATENT DOCUMENTS

| | | |
|---|---|---|
| 2010/0074440 A1 | 3/2010 | Lee et al. |
| 2010/0246815 A1* | 9/2010 | Olson ................. G06F 7/483 380/29 |
| 2010/0254530 A1 | 10/2010 | Wang et al. |
| 2011/0013769 A1 | 1/2011 | Itoh et al. |

OTHER PUBLICATIONS

International Search Report and Written Opinion received for PCT Application No. PCT/US2015/030532, dated Aug. 20, 2015, 9 pages.
Abassi, et al., "A Compact S-Box Design for SMS4 Block Cipher," IT Convergence and Services Lecture Notes in Electrical Engineering vol. 107, 2011, pp. 641-658.
U.S. Appl. No. 14/337,999, filed Jul. 22, 2014, 72 pages.
SMS4 Encryption Algorithm for Wireless Networks, Translated and Typeset by Whitfield Diffie of Sun Microsystems and George Ledin of Sonoma State University, May 15, 2008, Version 1.03, 5 pages.
Search Report Received for Taiwan Application No. 104111427, dated Mar. 16, 2016, 1 page of English Translation and 1 page of Taiwan Search Report.
International Preliminary Report on Patentability and Written Opinion issued in PCT application No. PCT/US2015/030532, dated Dec. 1, 2016, 6 pages.

* cited by examiner

TECHNOLOGIES FOR MODIFYING A FIRST CRYPTOGRAPHIC CIPHER WITH OPERATIONS OF A SECOND CRYPTOGRAPHIC CIPHER

FIELD

The present disclosure relates to technologies for modifying cryptographic ciphers and, in particular, to technologies for modifying a first cryptographic cipher with one or more operations of a second cryptographic cipher. Methods, computer readable media, and apparatus including and/or utilizing such technologies are also disclosed.

BACKGROUND

Cryptographic ciphers often utilize an algorithm and a key to protect information. The algorithm may be a complex mathematical function, and the key may be a string of bits. Various types of ciphers are known, including those that utilize a "secret" key, and those that utilize a "public" key. Ciphers that utilize a secret key may operate based on the use of a single key that is shared between multiple parties. In such instances the single key may be used to encrypt and decrypt information. In contrast, a cipher utilizing a public key may use two keys to protect information, i.e., a widely distributed (i.e., public) key, and a different, "private" key that is not widely distributed. In such algorithms the public key may be used to encrypt information to produce cipher text that can only be decrypted using the private key.

The advanced encryption standard (AES) is one type of cryptographic cipher that utilizes a secret key (cipher key) to transform intelligible data (plaintext) into unintelligible data (cipher text). The transformations in the AES cipher are performed over a series of rounds, and include: (1) adding a round key (value derived from the cipher key) to the state (a two dimensional array of bytes) using an exclusive XOR operation (AddRoundKey); (2) processing the state using a non-linear byte substitution table (SubBytes, also called S-Box); (3) cyclically shifting the last three rows of the state by different offsets (ShiftRows); and (4) taking all of the columns of the state and mixing their data independently of one another to produce new columns (MixColumns). Decryption (inverse cipher) uses the cipher key to transform the cipher text into plaintext by performing the inverse of the transformations in the cipher.

AES is compute intensive and its performance on general purposes processors was relatively slow when it was first introduced. Subsequent to its introduction a new instruction set architecture for AES was developed. The new instruction set architecture, referred to as AES-New Instructions or AES-NI, improves the performance of AES on a general purpose processors in part by grouping sequences of AES operations into single operations. The use of AES-NI also hardens the AES cipher against so-called "side-channel attacks." A detailed description of AES-NI and its ability to protect against side channel attacks can be found in S. Gueron. Intel Advanced Encryption Standard (AES) Instructions Set, Rev 3.01 (September 2012), available at http://software.intel.com/sites/default/files/article/165683/aes-wp-2012-09-22-v01.pdf, the entire content of which is incorporated herein by reference. Details of the AES cipher may be found in Federal Information Processing Standard (FIPS) 197, the entire content of which is incorporated here by reference. FIPS 197 may be found at http://csrc.nist.gov/publications/fips/fips197/fips-197.pdf.

SMS4 is another type of cryptographic cipher that utilizes a secret key (cipher key) to transform plaintext into cipher text. SMS4 is an unbalanced Feistel network cipher with a block size of 128 bits (16 bytes) and a key size of 128 bits (16 bytes). Like AES, SMS4 encrypts plaintext and decrypts cipher text in a series of rounds. During execution of SMS4 each 128 bit input block is divided into four 32 bit words. Each encryption round of SMS4 includes two transformations, a non-linear S-box transformation (τ) and a linear transformation (L). An English translation of the SMS4 specification is provided in Whitfield Diffie and George Ledin (translators), "SMS4 Encryption Algorithm for Wireless Networks," Cryptology Eprint Archive, Report 2008/329, 2008, available at http://eprint.iacr.org, the entire content of which is incorporated herein by reference.

Although SMS4 is a useful cipher its performance on general purpose processors is presently about the same as the performance of AES prior to the implementation of AES-NI. Moreover the non-linear transformation in SMS4 relies on the use of an S-box lookup table that is defined in the SMS4 specification. Use of that lookup table may expose the cipher to certain types of attack, such as but not limited to side channel attacks. The practical usefulness of SMS4 may therefore be limited, and may be overshadowed by the improved performance and security exhibited by other ciphers such as AES.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
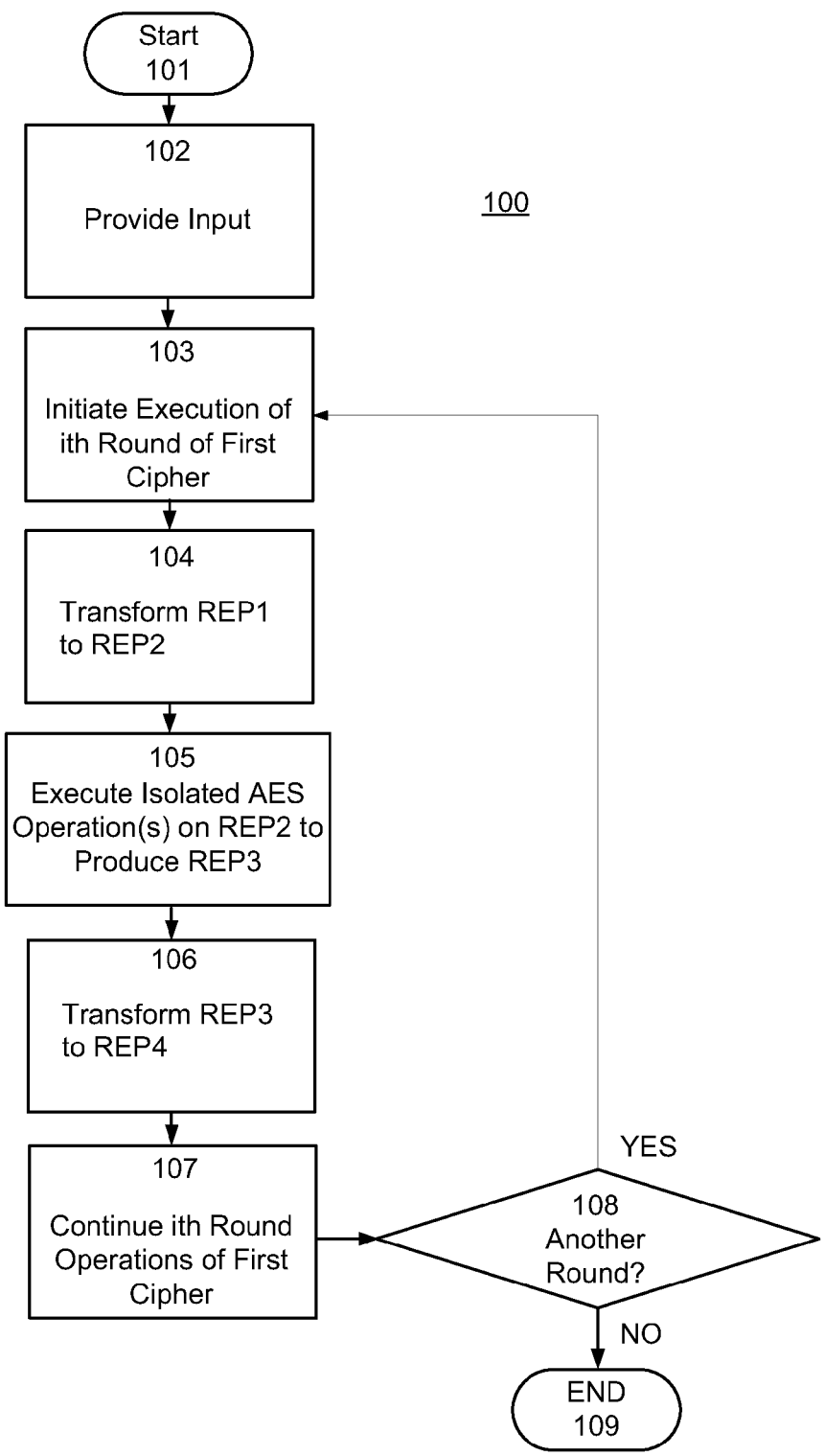
FIG. 1 is a flow chart of example operations that may be performed in one embodiment of a method consistent with the present disclosure.

Although the following Detailed Description will proceed with reference being made to illustrative embodiments, many alternatives, modifications, and variations thereof will be apparent to those skilled in the art.

DETAILED DESCRIPTION

The present disclosure generally relates to technologies for modifying a first cryptographic cipher with one or more operations of a second cryptographic cipher. For example, the technologies described herein may modify a first cryptographic cipher (also referred to herein as a "first cipher") by replacing at least one operation of the first cipher with at least one isolated operation of the second cryptographic cipher (also referred to herein as a "second cipher").

In some embodiments the resulting modified first cipher (also referred to herein as a "modified cipher") may exhibit enhanced performance and/or other benefits relative to the (unmodified) first cipher. For example the modified cipher may execute faster and/or more efficiently on a processor, relative to the unmodified first cipher. These improvements may be attributable to the replacement of one or more operations of the first cipher with the isolated operation(s) of the second cipher. For example an isolated operation of the first cipher may execute faster and/or more efficiently than the operation of the first cipher it replaces, resulting in an overall improvement in performance, relative to the unmodified first cipher.

Alternatively or additionally, the modified cipher may exhibit improved security against certain types of attacks relative to the unmodified first cipher. Such improvements to security may also be attributable to the replacement of one or more operations of the first cipher with one or more isolated operations of the second cipher. For example in some embodiments an unmodified first cipher may include an operation that relies on a lookup table, whereas that operation may be replaced in the modified cipher by an operation of a second cipher that does not rely on a lookup table. The modified cipher may therefore be less susceptible to certain types of attack than the unmodified first cipher, such as but not limited to side channel attacks that may target or otherwise take advantage of a lookup table.

For the sake of clarity the present disclosure focuses on example embodiments in which the first cipher is the SMS4 cipher, and the second cipher is the Advanced Encryption Standard (AES) as executed with AES-NI. In particular, the present disclosure focuses on example embodiments in which a modified SMS4 cipher is utilized, in which the S-box and/or inverse S-Box transformations of SMS4 is/are replaced with isolated AES S-Box and/or inverse S-Box transformations specified in AES-NI. More generally, in some embodiments the technologies described herein utilize a modified SMS4 cipher in which execution of the AES S-box and/or inverse S-Box operations (isolated through the implementation of certain instructions) replaces execution of the corresponding SMS4 S-box and/or inverse S-Box functions, respectively.

As will be described later, due to instruction set optimization and other factors the modified SMS4 cipher may execute on a processor faster and/or more efficiently than the execution of an unmodified SMS4 cipher (i.e., SMS4 executed in accordance with its specification). This improvement in speed and/or efficiency may be attributable to the use of isolated AES S-box and/or inverse S-Box functions in the modified SMS4 cipher, which may execute faster and/or more efficiently than the SMS4 S-box and/or inverse SMS4 S-box operations they replace. In some embodiments the modified SMS4 cipher may also exhibit improved security relative to that of an unmodified SMS4 cipher. This improvement in security may be attributable to the use of isolated AES S-box and/or inverse S-Box operations in the modified SMS4 cipher. Unlike the SMS4 S-box and inverse S-box operations, the isolated AES S-box and/or inverse S-box operations do not require the use of a lookup table, such as the S-Box lookup table specified in the SMS4 standard. The modified SMS4 cipher may therefore be hardened against attacks that may rely on, use, and/or target lookup tables, such as but not limited to side channel attacks While the present disclosure focuses on example embodiments wherein isolated AES S-box operation and/or inverse S-Box operations are used in a modified SMS4 cipher instead of the S-box and/or inverse S-box operations detailed in the SMS4 specification, it should be understood that such embodiments are illustrative only and that the technologies described herein may be used in conjunction with cryptographic ciphers other than SMS4. Moreover, the isolated AES operations described herein are not limited to the isolated AES S-Box and Inverse S-Box operations that are described for use in conjunction with execution of a modified SMS4 cipher. Indeed, the present disclosure contemplates embodiments wherein any isolated AES operation may be used to modify a corresponding operation of a number of other (non-AES) ciphers.

Indeed as will be appreciated by those of skill in the art, the technologies of the present disclosure may be used to modify a number of (non-AES) ciphers. In particular the technologies described herein may be used to modify any cryptographic cipher that includes a function (e.g., a transformation) that operates on data (state) that is presented in a Galois Field (GF) that is of the same size as Galois Field representation used in AES, e.g., $GF(2)^8$, even if the representation of $GF(2)^8$ used in the to-be modified cipher is not the same as the $GF(2)^8$ representation used in AES. Non-limiting examples of such ciphers (other than SMS4) include the Camellia cipher.

As further described below there are many different representations of $GF(2)^8$. Because such representations are the same size however, they are mathematically isomorphic. Data presented in a first representation of $GF(2)^8$ (REP1) may therefore be transformed into a second representation of $GF(2)^8$ (REP2) using a first mapping function, which may be in the form of a first affine transformation that employs a mapping matrix and other elements, such as a vector and a shift. Likewise, REP2 may be transformed to REP1 using a second mapping function, which may be in the form of a second affine transformation that employs the inverse of the mapping matrix and other elements, such as a vector and a shift.

The technologies described herein capitalize on the mathematical relationship between various representations of $GF(2)^8$, which enables the transformation of data (state) presented in REP1, e.g., in connection with the execution of one or more operations of a first cipher such as SMS4, into the $GF(2)^8$ representation utilized in AES (i.e., REP2). Once data (state) is presented in REP2, one or more isolated AES operations may then be performed to produce an output, REP3, where REP3 is a $GF(2)^8$ representation that is identical to REP2 except insofar as it contains the output data (state) produced by execution of the isolated AES operation(s). The output data (state) in REP3 may then be transformed into a fourth representation of $GF(2)^8$, REP4, where REP4 is identical to REP1 except insofar as it contains the output data (state) produced in connection with the isolated AES operation(s). Execution of the first cipher may then continue, e.g., utilizing the data (state) presented in REP4.

Put in other terms, the technologies described herein leverage the isomorphic relationship of the $GF(2)^8$ representation used in AES and various representations of data (state) in $GF(2)^8$ that may be utilized in connection with various operations of ciphers other than AES. Based on this relationship one or more operations of a first (non-AES) cipher that execute on data presented in a representation of $GF(2)^8$ may be replaced with isolated operations of AES. The resulting modified cipher may exhibit one or more benefits, such as improved execution speed relative to the unmodified first cipher, improve execution efficiency (e.g., requiring fewer clock cycles to process data) relative to the unmodified first cipher, and/or improved security relative to the unmodified first cipher.

As noted above the technologies of the present disclosure generally replace one or more operations of a first cipher such as SMS4 with an isolated operation of a second cipher such as AES. While the present disclosure contemplates embodiments in which a correct output may be attained without further modification of the cipher, in some embodiments merely executing an isolated AES operation instead of the replaced operation of the first cipher may produce an incorrect output (i.e., an output that differs from the output that would have been produced by executing the unmodified cipher on the same input). To address this issue the technologies described herein may employ one or more additional operations (executed before or after any of the aforementioned $GF(2)^8$ transformations) that serve to account for differences in the manner in which an isolated AES operation processes data, relative to a replaced operation of a first cipher. Use of such operations may ensure that the data (state) in REP4 is identical to the data (state) that would have been produced by executing the replaced operation(s) of the first cipher.

With the foregoing in mind, one aspect of the present disclosure relates to methods for executing modified cipher. In some embodiments the modified cipher is a non-AES cipher that includes at least one operation that executes on data (state) that is presented in a first representation of $GF(2)^8$ (REP1), wherein REP1 is isomorphic with the representation of $GF(2)^8$ used in AES (REP2). In this regard reference is made to FIG. 1, which is a flow chart of example operations that may be performed in connection with one example embodiment of a method of executing a modified cipher consistent with the present disclosure to encrypt or decrypt input data (state).

As shown in FIG. 1, method 100 begins at block 101. The method may then proceed to block 102, wherein an input may be provided. While the present disclosure envisions embodiments wherein the input provided pursuant to block 102 is plain text or cipher text (i.e., in a first encryption or decryption round), the input data need not be plaintext or cipher text. Indeed, the input data may be any data upon which operations of the modified cipher are to be performed. In some embodiments, the input data provided pursuant to block 102 may be present in an xmm register of a processor.

Once the input data is provided the method may proceed to block 103, wherein execution of an ith encryption or decryption round of a first cipher may be initiated. The first cipher may therefore be understood to be a cipher that encrypts or decrypts an input over number of rounds, $R_t$, where i may be any suitable value. In instances where the first cipher is SMS4, for example, i may indicate one of the 32 rounds of SMS4 detailed in its specification.

Subsequent to initiation of the ith round of the first cipher, one or more operations of the first cipher (e.g., consistent with a round function thereof) may be performed on the input data (state). Such operations may include, for example one or more linear or non-linear transformations, exclusive OR (XOR) operations, shift rows operations, mix columns operations, other types of transformations, combinations thereof, and the like. In some embodiments, prior to execution of one or more operations of the first cipher the elements of the input data (state) may be arranged in a first representation of $GF(2)^8$ (REP1) that is isomorphic with the representation of $GF(2)^8$ used in AES (i.e., REP2).

At this point the method may proceed to block 104, wherein REP1 may be transformed to REP2, e.g., prior to execution of one or more operations of the first cipher on the data elements of REP1. The transformation of REP1 to REP2 may be performed in any suitable manner. In some embodiments and as will be described in detail with respect to the implementation of a modified SMS4 cipher, the transformation of REP1 to REP2 may be performed with a first mapping function that maps the elements of REP1 to REP2.

The method may then proceed to block 105, wherein one or more isolated AES operations may be performed on the data (state) as presented in REP2. As noted previously any suitable isolated AES operations may be used, provided that the isolated operation can replace a corresponding operation of the first cipher and provide a correct result. In some embodiments, the isolated AES operation(s) include one or more or of an isolated AES S-Box and/or inverse S-box operation, which may replace the execution of an S-box and/or inverse S-box operation of the first cipher on data elements of REP1. As shown in FIG. 1, execution of the isolated AES operation(s) may output data (state) in the form of a third representation of $GF(2)^8$, REP3. As noted previously REP3 may be identical to REP2 except insofar as its elements are the output of the execution of the isolated AES operation(s) on the elements of REP2.

As briefly explained above in some instances the isolated AES operation and the corresponding replaced operation of the first cipher may process data in REP1 differently. For example and as will be explained further below, execution of the round function of SMS4 involves (in part) the execution of 4 parallel S-boxes, each of which operates on one quarter of an input block. In some embodiments of the present disclosure a modified SMS4 cipher may be used, in which at least one of the SMS4 S-Box operations is replaced with an isolated AES S-box operation. Because the AES S-Box may operate on the entire state at once, merely executing the isolated AES S-Box operation instead of the SMS4 S-box may produce an incorrect result. To address this issue one or more transposition operations may be performed to transpose the elements of REP1 such that a correct result may be achieved. For example, in some embodiments a transposition operation in the form of a shift rows operation may be performed to transpose elements of REP1 prior to transforming REP1 to REP2, e.g., so as to produce transposed data that accounts for the processing differences between an SMS4 S-box and/or inverse S-box operation that is and an isolated AES S-box and/or inverse S-box operation, respectively.

In any case the method may then proceed to block 106, wherein REP3 may be transformed to a fourth representation of $GF(2)^8$, REP4, e.g., using an inverse of the transformation of REP1 to REP2 described above with respect to block 104. The transformation of REP3 to REP4 may in some embodiments be performed with a second mapping function, which as noted previously may employ an inverse of a mapping matrix employed in the first mapping function executed pursuant to block 104. In any case REP4 may be identical to REP1, except insofar as its elements are the output of the execution of the isolated AES operation(s) on the elements of REP2. That is, REP4 may be a $GF(2)^8$ representation of the output of the isolated AES operation(s) that is suitable for use in one or more additional operations of the first cipher.

In some embodiments the isolated AES operation(s) may produce an output in REP4 that is identical to the output that would have been produced by executing the replaced operations of the first cipher on the elements of the data (state) in REP1. In other embodiments, the isolated AES operation(s) may produce an output in which the elements of REP4 are transposed, relative to the arrangement of elements that would have been produced by executing the replaced operations of the first cipher on the elements of REP1. In such instances one or more transposition operations may be applied to rearrange the elements of REP4, such that REP4 (containing the transposed elements) is identical to the output that would have been produced by executing the replaced operations of the first cipher on the elements of REP1. Alternatively, a similar transposition operation may be performed on the elements of REP3, such that when REP3 is converted to REP4, REP4 is identical to the output that would have been produced by executing the replaced operations of the first cipher on the elements of REP1.

For example in embodiments wherein the first cipher is SMS4 and an isolated AES S-box or inverse S-box operation is used to replace the S-box or inverse S-Box operation indicated in the SMS4 specification, execution of the isolated AES S-box and/or inverse AES S-box operation may produce an output in REP3, which when converted to REP4 contains data elements that are transposed relative to the output that would have been produced by the execution of the corresponding SMS4 S-box operations on the elements of REP1. To address this issue one or more transposition operations may be executed to adjust the position of the elements in REP3, such that the elements of REP4 are identical to those in an output that would have been produced by the execution of the S-box and/or inverse S-box operations in the SMS4 specification on the elements of REP1. Alternatively a transposition operation could be performed on the elements of REP4 instead of the elements of REP3.

The method may then proceed to block 107, wherein additional operations of the ith round of the first cipher may be performed on the data (state) elements as presented in REP4 (with or without transposition). Such operations may include any operations specified by the round function (or another function) of the first cipher that are to follow the operation(s) that were replaced by the execution of the isolated AES operation(s) pursuant to block 105. For example where the first cipher is SMS4 and an isolated AES S-box operation is used to replace the SMS4 S-box pursuant to block 105, the additional operations performed pursuant to block 107 may include the linear transformation and final exclusive or (XOR) operations indicated in the SMS4 specification.

The method may then proceed to block 108, wherein a determination may be made as to whether an additional encryption or decryption round is to be performed in accordance with the first cipher. If so, the method may proceed back to block 103 and repeat. Otherwise the method may proceed to block 109 and end.

Figure 2:
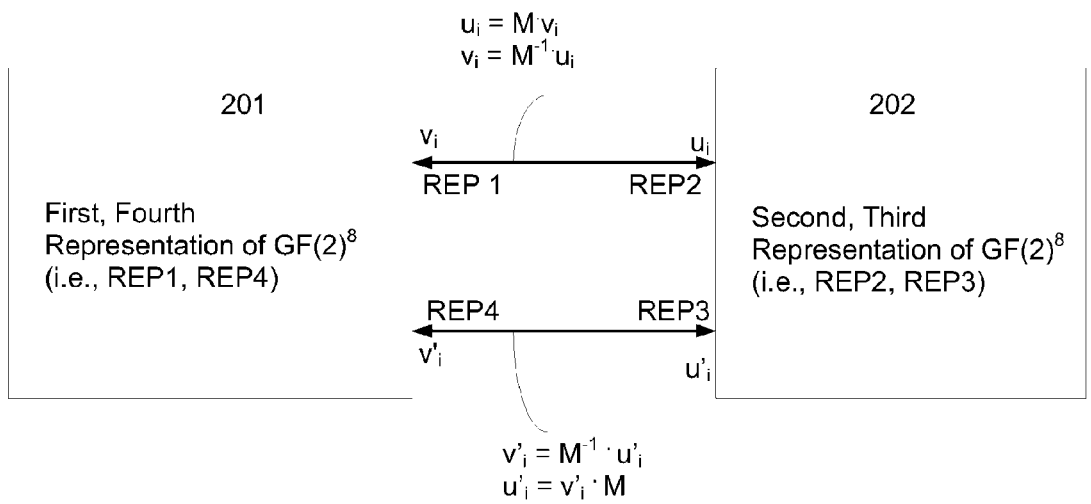
FIG. 2 is a block diagram illustrating example transformations consistent with the present disclosure.

Reference is now made to FIG. 2, which is a block diagram illustrating the isomorphic nature of the various representations of $GF(2)^8$ that may be used in the modified ciphers in accordance with the present disclosure. Block 201 represents the forms of $GF(2)^8$ that may be presented in connection with and/or operated on by operations of a first cipher, in this case REP1 and REP4. In contrast, block 202 represents the forms of $GF(2)^8$ that may be presented in connection with and/or operated on by operations of an isolated AES operation that may replace one or more operations of the first cipher. Although each of REP1, REP2, REP3, and REP4 are finite fields with 256 elements, they may differ in certain respects such as in the arrangement of data (state), the type of data (state) contained therein (e.g., before or after processing by an isolated AES operation), etc.

In the illustrated case REP1 includes the same data elements as REP2, but the representation of those elements in REP1 differs from REP2. Nonetheless the data elements in REP1 may be transformed into REP2 with a mapping function, M, as discussed above. As illustrated in the FIG., if $v_i$ (where i ranges from 1-256) is an element of REP1, the image ($u_i$) of $v_i$ in REP2 is given by the function $u_i = M \cdot v_i$. Conversely, the image ($v_i$) of element $u_i$ in REP1 is given by the function $v_i = M^{-1} \cdot u_i$. Once REP2 has been obtained, isolated operations may be performed on elements $u_i$ to produce an output (REP3) in $GF(2)^8$ that contain elements $u'_i$, where any given u' is the result of the isolated AES operation on a corresponding element u of REP2. It should be understood that elements $u'_i$ in REP3 are presented in the same manner as the elements $u_i$ of REP2. That is, REP3 and REP2 are identical, except insofar as elements $u'_i$ are the output of an isolated AES operation on a corresponding element $u_i$ in REP2.

Consistent with the foregoing discussion the elements $u'_i$ of REP3 may then be converted back to a form of $GF(2)^8$ that may be used in additional operations of the first cipher, i.e. a form consistent with REP1. This is illustrated in FIG. 2, which indicates that the image ($v'_i$) of elements u' in REP4 is given by the function $v'_i = u'_i \cdot M^{-1}$, where $M^{-1}$ is the inverse of the mapping function M used to image elements $v_i$ of REP1 to elements $u_i$ of REP2. Conversely, the image ($u'_i$) of elements $v'_i$ in REP4 is given by the function $u'_i = v'_i \cdot M$.

In some embodiments M may be or may include a mapping matrix that maps elements of REP1 to REP2, and its inverse ($M^{-1}$) may map elements of REP2 to REP1. Likewise, M in such embodiments may also map elements of REP3 to REP4, and $M^{-1}$ may map elements of REP4 to REP3. Without limitation, in some embodiments REP1 and REP4 are representations of $GF(2)^8$ suitable for use in one or more SMS4 operations, REP2 and REP3 are representation of $GF(2)^8$ suitable for use in one or more isolated AES operations, M is or includes an 8×8 matrix that can map elements of REP1 to REP2 and REP4 to REP3, and $M^{-1}$ is the inverse of M and can map elements of REP2 to REP1 and REP3 to REP4.

For the sake of illustration the present disclosure will now proceed to describe example embodiments in which the SMS4 cipher is modified by replacing one or more SMS4 operations (e.g., the SMS4 S-box and/or inverse S-box operations) with one or more isolated AES operations, namely the AES S-Box and/or inverse S-box operations as implemented with AES-NI. As noted previously these example embodiments are illustrative only, and the present disclosure contemplates embodiments where a wide variety of ciphers may be modified via one or more isolated AES operations, including those other than the isolated AES S-box and/or inverse S-box.

SMS4 is an unbalanced Feistel network cipher that utilizes a 128 bit input block and a 128 bit key. The input block consists of four 32 bit words $MK_n$ (where n=0 . . . 3). The round key schedule of SMS4 is derived from an encryption (cipher) key, wherein each round key is 32 bits long and is represented by $rk_i$ (where i=0 . . . 31) The output of SMS4 is produced in a 128-bit output block consisting of four 32 bit words, which for encryption are represented in the SMS4 standard by $FK_{0\ldots3}$ and for decryption are represented in the SMS4 standard by $CK_{0\ldots3}$.

Figure 3:
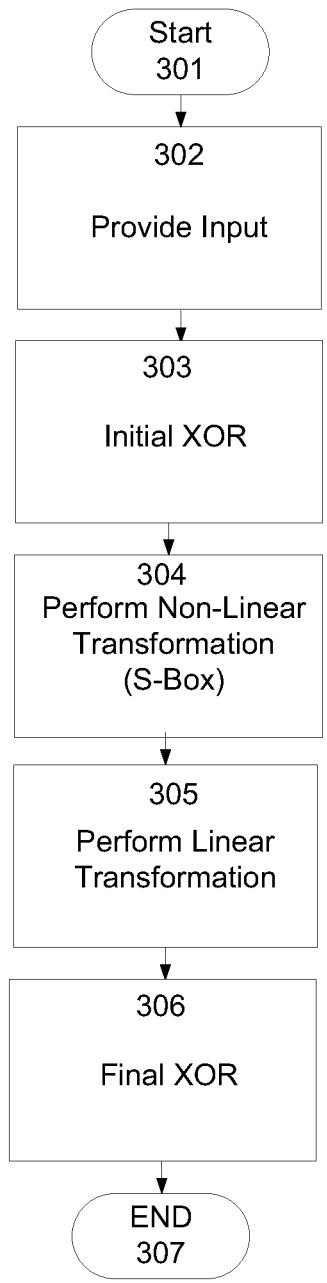
FIG. 3 is a flow chart of example operations that may be performed in additional embodiments of a method consistent with the present disclosure.

FIG. 3 is a flow diagram illustrating major operations of the SMS4 round function. For the sake of illustration the SMS4 round function will be described assuming that a single round is used, but it should be understood that the SMS4 specification calls for the execution of 32 rounds. Assuming a single round and a 128 bit input block, the SMS4 round function (F) may be given (using the notation in the SMS4 specification by the function (I) below:

$$F(X_0, X_1, X_2, X_3) = X_0 \oplus T(X_1 \oplus X_2 \oplus X_3 \oplus rk) \quad (I)$$

in which $X_{0\ldots3}$ are 32 bit elements of the 128 bit input block, ⊕ denotes a bitwise exclusive OR (XOR) of two 32 bit vectors, T is the mixer-substitution detailed in the SMS4 specification, and rk is an appropriate round key. Per the SMS4 specification, rk may be selected from a round key schedule that is derived from a cipher key. The round key schedule may be pre-computed or computed on the fly.

An SMS4 round 300 may begin at block 301, as shown in FIG. 3. Execution may then proceed to block 302, wherein a 128 bit input data block may be provided. Execution may then proceed to block 303, wherein the input data block may be divided into four 32 bit elements ($X_0$, $X_1$, $X_2$, $X_3$), which may then be subject to an exclusive OR (XOR) operation with a corresponding round key rk, as shown in function (I) above.

The output state may then be subject to the mixer-substitution (T), as shown in function (I) above. Per the SMS4 specification, mixer substitution (T) consists of two transformations. The first transformation is a non-linear transformation ($\tau$), which is applied pursuant to block 304 if FIG. 3. The non-linear transformation $\tau$ applies four S-Box's in parallel, one for each quarter of an input. For example, given a 32 bit input element A (where A=$a_0$, $a_1$, $a_2$, $a_3$, each of which is 8 bits of A)) and a 32 bit output element B (where B=$b_0$, $b_1$, $b_2$, $b_3$, each of which is 8 bits long), $\tau$(A) is represented (using the notation of the SMS4 specification) by function (II) below:

$$B = (b_0, b_1, b_2, b_3) = \tau(A) = (Sbox(a_0), Sbox(a_1), Sbox(a_2), Sbox(a_3)). \quad (II)$$

The second transformation applied in a round of SMS4 is a linear substitution (L), which is applied pursuant to block 305 of FIG. 3. Using the notation of the SMS4 specification, the linear substitution L operates on B and produces an output C as shown by function (III) below:

$$C = L(B) = B \oplus (B <<< 2) \oplus (B <<< 10) \oplus (B <<< 18) \oplus (B <<< 24) \quad (III)$$

in which $\oplus$ represents a bitwise XOR of two 32 bit vectors and $<<<$ represents circular left shifting by the specified number of bits (i.e., 2, 10, 18, 24).

The official SMS4 S-box applied in non-linear transformation $\tau$ is based on a lookup table of values defined in the SMS4 specification. However, the SMS4 S-box may also be represented as an affine transformation over Galois Field 2 (GF(2), followed by an inversion over Galois Field 256 (GF($2)^8$), followed by another affine transformation over GF(2), as shown in function (IV) below:

$$S_{SMS4}(x) = A_2 \cdot I(A_1 \cdot x + C_1) + C_2 \quad (IV)$$

wherein I represents inversion over GF($2)^8$, $A_1$ and $A_2$ are 8×8 binary matrices (shown below) and $C_1$ and $C_2$ are 8 bit vectors (also shown below):

$$A_1 = \begin{bmatrix} 1 & 0 & 1 & 0 & 0 & 1 & 1 & 1 \\ 0 & 1 & 0 & 0 & 1 & 1 & 1 & 1 \\ 1 & 0 & 0 & 1 & 1 & 1 & 1 & 0 \\ 0 & 0 & 1 & 1 & 1 & 1 & 0 & 1 \\ 0 & 1 & 1 & 1 & 1 & 0 & 1 & 0 \\ 1 & 1 & 1 & 1 & 0 & 1 & 0 & 0 \\ 1 & 1 & 1 & 0 & 1 & 0 & 0 & 1 \\ 1 & 1 & 0 & 1 & 0 & 0 & 1 & 1 \end{bmatrix} A_2 = \begin{bmatrix} 1 & 1 & 0 & 0 & 1 & 0 & 1 & 1 \\ 1 & 0 & 0 & 1 & 0 & 1 & 1 & 1 \\ 0 & 0 & 1 & 0 & 1 & 1 & 1 & 1 \\ 0 & 1 & 0 & 1 & 1 & 1 & 1 & 0 \\ 1 & 0 & 1 & 1 & 1 & 1 & 0 & 0 \\ 0 & 1 & 1 & 1 & 1 & 0 & 0 & 1 \\ 1 & 1 & 1 & 1 & 0 & 0 & 1 & 0 \\ 1 & 1 & 1 & 0 & 0 & 1 & 0 & 1 \end{bmatrix}$$

$$C_1 = (1, 1, 0, 0, 1, 0, 1, 1)^T$$
$$C_2 = (1, 1, 0, 1, 0, 0, 1, 1)^T$$

When the S-box is used in SMS4, it is applied four times in parallel, to an entire word. Therefore the entire S-box operation ($S_{sms4}$(X)) of SMS4 may be represented by function (V) below:

$$S_{SMS4}(X) = s(x_0)s(x_1)s(x_2)s(x_3) \quad (V)$$

where X=A and $x_1$, $x_2$, $x_3$ and $x_4$ equal $a_0$, $a_1$, $a_2$ and $a_3$ as defined above in connection with function (II).

In the above representation of the SMS4 S-box, conversion from GF(2) to GF($2)^8$ is performed with the irreducible polynomial f(x)=$x^8+x^7+x^6+x^5$, $+x^4+x^2+1$, where the first term represents the constant term in a polynomial of degree 7, the second term represents the x coefficient, etc. In any case, it may be understood that the SMS4 S-box operations are performed on data (state) that is presented in one representation of GF($2)^8$, e.g., REP1.

In contrast to SMS4, AES is a block cipher that operates on a 128-bit input block with a key size of 128, 192, or 256 bits. The AES cipher transforms a 128-bit plaintext block into 128 bits of cipher text and vice versa in a number of AES rounds, wherein the number of rounds varies with the size of the key. A sequence of transformations is iterated for each AES round. For an AES encryption round, the sequence of transformations includes an AddRoundKey transformation, a SubstituteBytes (SubBytes) Transformation, a ShiftRows transformation, and a MixColumns transformation.

In the AddRoundKey transformation a round key (derived from a cipher key) is added to the input state (a two dimensional 128-bit array of bytes) using an exclusive OR (XOR) operation. The AddRoundKey transformation therefore is a (128 bit, 128 bit)→128 bit transformation which is defined as a bitwise exclusive OR (XOR) of its two arguments, which in the AES flow are the input (state) and the round key.

In the SubBytes transformation input (state) is processed using a non-linear byte substitution table (S-box), hereinafter referred to as the AES S-box. In particular, the AES S-box transformation is a 16 byte to 16 byte (byte wise) transformation which is defined by applying an S-box transformation to each of the 16 bytes of the state. Unlike the SMS4 S-box, the AES S-box ($S_{AES}$(x)) may be represented as an affine transformation over inversion in GF($2)^8$, as shown by formula (VI) below:

$$S_{AES}(x) = A \cdot x^{-1} + 0x63 \quad (VI)$$

in which A is an 8×8 (fixed) binary matrix (specified in FIPS 197), 0x63 is an 8-bit vector (constant), and x is the input. The inversion is done in GF($2)^8$ represented by the reduction polynomial $x^8+x^4+x^3+x+1$.

It may therefore be understood that AES S-box operations are performed on data (state) that is presented in a second representation of GF($2)^8$ (i.e., REP2) that differs from the GF($2)^8$ representation used in SMS4, i.e., REP1. As explained above and further explained below however, REP1 and REP2 are mathematically isomorphic. As such REP1 may be transformed into REP2 (and vice versa) and using an appropriate mapping function.

With the foregoing in mind, the inventors have discovered a relationship between the SMS4 S-box and the AES S-box, based in part on the use of function (VII) below:

$$s(x) = S_{AES}(x) + 0x63 \Leftrightarrow A^{-1} \cdot (s+0x63) = x^{-1} \quad (VII)$$

In that function, s and x are bytes, s(x) indicates the s is a function of x, $S_{AES}$ denote the AES S-box, and $A^{-1}$ is an inversion of matrix A defined by FIPS 197. As can be seen from function (VII), s is a function of x, and by inverting the function it is possible to express x as a function of s. From this, it can be concluded that the inverse of $GF(2)^8$ used in AES (i.e., the inverse of REP2) is equal to an affine transformation over $S_{AES}(x)$.

The inventors also discovered mapping functions that may be used to map elements in the $GF(2)^8$ representation used in SMS4 (REP1) to the $GF(2)^8$ representation used in AES (REP2), and vice versa. Specifically, the inventors discovered that the elements in the $GF(2)^8$ representation used in SMS4 (REP1) may be mapped to the $GF(2)^8$ representation used in AES using a first affine transformation function, which is shown as function (VIII) below:

$$y=\text{Affine1}(x)=M(A_1 \cdot x + C_1)) \quad \text{(VIII)}$$

in which y is the mapped output (an element in REP2), $A_1$ and $C_1$ are as defined above for formula (IV), x is the input (i.e., an element of REP1) and M is a pre-computed mapping matrix. In some embodiments, M is as shown below:

$$M = \begin{matrix} 0 & 1 & 1 & 0 & 0 & 0 & 1 & 0 \\ 1 & 1 & 1 & 0 & 1 & 0 & 1 & 0 \\ 0 & 0 & 1 & 1 & 1 & 1 & 0 & 0 \\ 1 & 0 & 0 & 0 & 0 & 1 & 1 & 0 \\ 0 & 0 & 0 & 0 & 0 & 1 & 0 & 0 \\ 0 & 0 & 1 & 0 & 0 & 1 & 1 & 0 \\ 1 & 1 & 0 & 1 & 1 & 1 & 1 & 0 \\ 0 & 1 & 0 & 1 & 0 & 0 & 0 & 1 \end{matrix}$$

Elements in the $GF(2)^8$ representation used in AES (REP2) may be mapped to the $GF(2)^8$ representation used in SMS4 using a second affine transformation, which is shown as function (IX) below:

$$s=\text{Affine2}(u)=A_2 \cdot (M^{-1} \cdot A^{-1} \cdot u) + C_2 \quad \text{(IX)}$$

in which s is the mapped output (an element in REP1), $A_2$ and $C_2$ are as defined above for formula (IV), u is the input (i.e., an element of REP2), $M^{-1}$ is the inverse of the mapping matrix described above for formula (VIII) and $A^{-1}$ is the inverse of matrix A defined in FIPs 197. As may be appreciated from the foregoing, use of formulae VIII and IX permits the transformation of data presented in the $GF(2)^8$ representation used in SMS4 (REP1) to the $GF(2)^8$ representation used in AES (REP2), and vice versa.

Returning to the various operations of AES, in the AES ShiftRows transformation, the last three rows of the state are cyclically shifted by different offsets. The ShiftRows transformation is the following permutation (15, 14, 13, 12, 11, 10, 9, 8, 7, 6, 5, 4, 3, 2, 1, 0)→(11, 6, 1, 12, 7, 2, 13, 8, 3, 14, 9, 4, 15, 10, 5, 0), and is viewed as an operation on a 4×4 matrix representation of the state. The first row of the matrix is unchanged, whereas the second row, third row, and fourth row are rotated by 1, 2, and 3 byte positions, respectively.

In the MixColumns transformation, data from all of the columns of the state is mixed (independently of one another) to produce new columns. The MixColumns transformation is a 128 bit→128 bit transformation operating on the columns of the 4×4 matrix representation of the input (state). The MixColumns transformation treats each column as a third degree polynomial with coefficients in $GF(2)^8$. Each column of the 4×4 matrix representation of the state is multiplied by a polynomial $a(x)=\{03\}x^3+\{01\}x^2+\{01\}x+\{02\}$ and reduced modulo $x^4+1$.

Utilizing AES-NI, a sequence of transformations for an AES encryption round described above may be performed by a single AES encryption round instruction AESENC as shown below in Table 1 and for a last encryption round by a single AES last encryption round instruction AESENCLAST as shown below in Table 2.

TABLE 1

AESENC xmm1, xmm2/m128
State = xmm1;
Round Key = xmm2/m128;
Tmp=Shift Rows (State);
Tmp=Substitute Bytes (Tmp);
Tmp=Mix Columns (Tmp);
Output = xmm1 = Tmp XOR Round Key

TABLE 2

AESENCLAST xmm1, xmm2/m128
State = xmm1;
Round Key = xmm2/m128;
Tmp=Shift Rows (State);
Tmp=Substitute Bytes(Tmp);
Output = xmm1 = TMP XOR Round Key The AESENC and AESENCLAST instructions shown in Table 1 and Table 2 perform some sequences of transformations on a State (128 bits specified in an xmm register) and a Round Key (128 bits specified in an xmm register or as a memory pointer), or on a key (128, or 192 or 256 bits specified in xmm registers and/or memory). These instructions produce a 128 bit output. The corresponding sequences of 128 bits→128 bits transformations are described, using the terminology of LIPS publication 197.

The AES instructions (AESENC, AESENCLAST) shown in Tables 1 and 2 above process the data stored in the 128-bit variable (temp) (also referred to as the state) serially, as defined by the FIPS Publication 197. An example of the serial sequence of operations for processing N blocks of data over 10 rounds is shown below in Table 3 below.

TABLE 3

For i from 1 to N_BLOCKS do
  xmm1 = BLOCK [i] // load
  xmm1 = AESENC (xmm1, RK [1])
  xmm1 = AESENC (xmm1, RK [2])
  xmm1 = AESENC (xmm1, RK [3])
  ...
  xmm1 = AESENC (xmm1, RK [9])
  xmm1 = AESENCLAST(xmm1, RK [10])
  store xmm1
End For each of the N_Blocks to be encrypted, the data block is stored in a register, for example, an xmm register (xmm1) having 128-bits may be used to store a 128-bit block. The 10 encryption rounds are performed in series on the data block. For rounds 1 through 9 of a 10 round AES operation, an AESENC instruction is called to perform the round operations using the round key and the result of the previous round or the initial block data (if round 1). The AESENCLAST instruction is called to process the last round (round 10 in this example).

The sequence of transformations for an AES decryption round includes an AddRoundKey transformation, an inverse Substitute Byte (SubBytes) transformation, an Inverse ShiftRows transformation, and Inverse MixColumns Transformation. The AddRoundKey transformation during decryption is the same as the AddRoundKey transformation applied during encryption.

In the Inverse SubBytes transformation the state is processed using an inverse non-linear byte substitution table (inverse S-Box). Like the AES S-box (SubBytes), the AES inverse S0box (Inverse SubBytes) is a 16-byte→16-byte (byte-wise) transformation, but is defined by applying an Inverse S-Box function to each byte of the input.

The Inverse ShiftRows transformation is the inverse of the ShiftRows transformation applied during encryption, and is the following byte-wise permutation: (15, 14, 13, 12, 11, 10, 9, 8, 7, 6, 5, 4, 3, 2, 1, 0)→(3, 6, 9, 12, 15, 2, 5, 8, 11, 14, 1, 4, 7, 10, 13, 0). In P-A notation this permutation reads as follows: [P,O,N,M,L,K,J,I,H,G,F,E,D,C,B,A]→[D, G,J,M,P,C,F,I,L,O,B,E,H,K,N,A].

The Inverse MixColumns transformation is the inverse of the MixColumns transformation applied during encryption. Like the MixColumns transformation applied during an encryption round, Inverse MixColumns is a 128-bit→128-bit transformation operating on the columns of the 4×4 matrix representation of the input. The transformation treats each column in the 4×4 matrix as a third degree polynomial with coefficients in AES-GF256-Field. During the Inverse MixColumns transformation, each column of the 4×4 matrix representation of the state is multiplied by polynomial $a^{-1}(x)=\{0b\}x^3+\{0d\}x^2+\{09\}x+\{0e\}$ and reduced modulo $x^4+1$.

The sequence of transformations for a decryption round described above may be performed by a single AES decryption round instruction AESDEC as shown below in Table 4 and for a last decryption round by a single AES last decryption round instruction AESDECCLAST as shown below in Table 5:

second xmm register (i.e., xmm2) or as a memory pointer), or on a key (128, or 192 or 256 bits specified in xmm registers and/or memory). These instructions produce a 128 bit output. The corresponding sequences of 128 bit→128 bit transformations are described, using the terminology of FIPS publication 197.

Each of the four AES round instructions (AESENC, AESENCLAST, AESDEC, AESDECLAST) shown in Tables 1, 2, 4 and 5 can increase the performance of AES by performing several AES transformations together. Also by using combinations of AES instructions, the sub steps of the AES cipher (as defined by FIPS 197) can be obtained as isolated transformations. Those isolated transformations include the ShiftRows, inverse shift rows (InvShiftRows) SubBytes (S-box), InvSubBytes (inverse S-Box), MixColumns and InvMixColumns transformations. Detailed information explaining the isolation of various AES transformations (operations) can be found in S. Gueron. Intel Advanced Encryption Standard (AES) Instructions Set, Rev 3.01 (September 2012), available at http://software.intel.com/sites/default/files/article/165683/aes-wp-2012-09-22-v01.pdf, the entire content of which is again incorporated herein by reference.

For example, various AES operations may be isolated using the combinations of AES instructions shown in Table 5 below.

TABLE 5

| Isolated AES Operation | Combination of AES instructions |
| --- | --- |
| ShiftRows | PSHUFB, xmm0, x0b06010c07020d08030e09040f0a0500 |
| InvShiftRows | PSHUFB xmm0, 0x0306090c0f0205080b0e0104070a0d00 |
| MixColumns | AESDECLAST xmm0, x00000000000000000000000000000000, AESENC xmm0, 0x00000000000000000000000000000000) |
| InvMixColumns | AESENCLAST xmm0, 0x00000000000000000000000000000000, AESDEC xmm0, 0x00000000000000000000000000000000 |
| SubBytes (S-Box) | PSHUFB xmm0, 0x0306090c0f0205080b0e0104070a0d00. AESENCLAST xmm0, 0x00000000000000000000000000000000 |
| InvSubBytes (Inverse S-Box) | PSHUFB xmm0, 0x0b06010c07020d08030e09040f0a0500, AESDECLAST xmm0, 0x00000000000000000000000000000000 |

TABLE 4

AESDEC xmm1, xmm2/m128
State = xmm1;
Round Key = xmm2/m128;
Tmp=Inverse Shift Rows (State);
Tmp=Inverse Substitute Bytes (Tmp);
Tmp=Inverse Mix Columns (Tmp=);
Output = xmm1 = Add Round Key (Tmp=, Round Key)

TABLE 5

AESDECLAST xmm1, xmm2/m128
State = xmm1;
Round Key = xmm2/m128;
Tmp=Inverse Shift Rows (State);
Tmp=Inverse Substitute Bytes (Tmp);
Output = xmm1 = Add Round Key (Tmp, Round Key)

The AESDEC and AESDECLAST instructions shown in Table 4 and Table 5 perform some sequences of transformations on a State (128 bits specified in a first xmm register (i.e., xmm1)) and a Round Key (128 bits specified in a In table 5, PSHUFB is a packed shuffle bytes instruction. Generally, the PSHUFB instruction has two 128-bit inputs that may be referred to as two registers of bytes A and B. The PSHUFB instruction takes two registers of bytes $A=[a_{15}a_{14}a_{13} \ldots a_0]$ and $B=[b_{15}b_{14}b_{13} \ldots b_0]$ and replaces register A with $[ab_{15}ab_{14}ab_{13} \ldots ab_0]$. If the top bit of $b_i$ is set to 1, the ith entry of the result is 0.

Figure 4:
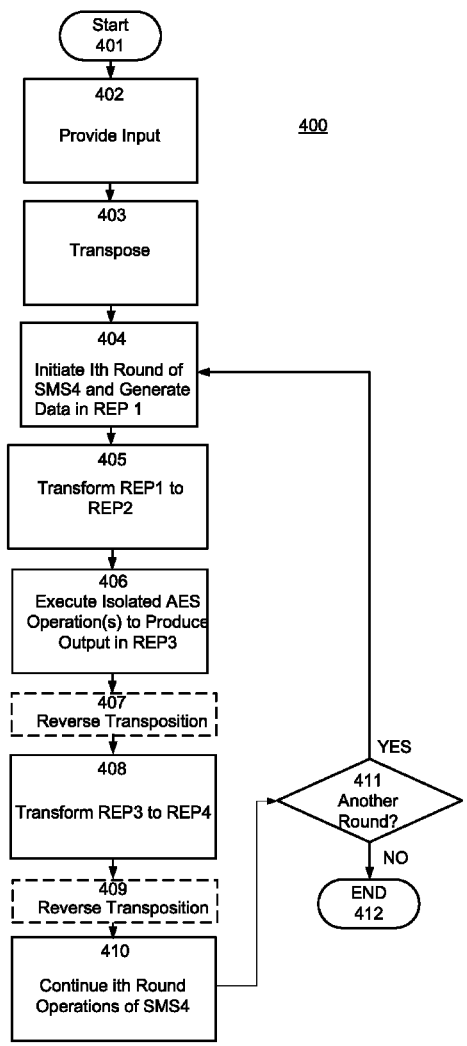
FIG. 4 is a flow chart of example operations that may be performed in further embodiments of a method consistent with the present disclosure.

With the foregoing in mind reference is made to FIG. 4, which is a flow diagram of example operations of a method of executing a modified SMS4 cipher consistent with the present disclosure. As will become apparent in this embodiment the modified SMS4 cipher employs one or more isolated AES s-box operations instead of the SMS4 S-box.

As shown method 400 begins a block 401. The method may then proceed to block 402, wherein an input data block may be provided in accordance with the SMS4 specification. As noted above, SMS4 operates on one quarter of its input state at a time. I.e., a 128 bit input block is divided into four 32 bit words, which (in the SMS4 non-linear transformation) are processed in four parallel S-box operations. In contrast, the AES S-box performs 16 S-box operations on 16 bytes of input data in a register at the same time. To account for this difference, the size and arrangement of the input data block(s) may be adjusted. In the embodiment of FIG. 4 for example, the input data block (P) may be provided as four 128 bit (16 byte) plaintext blocks ($P_{0...3}$), wherein each of $P_0$, $P_1$, $P_2$, $P_3$ include four 16 bit elements $a_0$, $a_1$, $a_2$, $a_3$. The input data block may therefore be represented as follows:

| | | P = | | |
|---|---|---|---|---|
| $P_0$ | $a_{0P0}$ | $a_{1P0}$ | $a_{2P0}$ | $a_{3P0}$ |
| $P_1$ | $a_{0P1}$ | $a_{1P1}$ | $a_{2P1}$ | $a_{3P1}$ |
| $P_2$ | $a_{0P2}$ | $a_{1P2}$ | $a_{2P2}$ | $a_{3P1}$ |
| $P_3$ | $a_{0P3}$ | $a_{1P3}$ | $a_{2P3}$ | $a_{3P1}$ |

The method may then proceed to block 403, wherein the elements of input data block P may be subject to a transposition operation to account for differences in how the SMS4 and AES S-Box and inverse S-Box operations process an input. For example, the elements of P may be subject to a shift rows transformation that produces transposed plaintext X (transposed data), wherein X may be represented as follows:

| | | X = | | |
|---|---|---|---|---|
| $X_0$ | $a_{0P0}$ | $a_{0P1}$ | $a_{0P2}$ | $a_{0P3}$ |
| $X_1$ | $a_{1P0}$ | $a_{1P1}$ | $a_{1P2}$ | $a_{1P3}$ |
| $X_2$ | $a_{2P0}$ | $a_{2P1}$ | $a_{2P2}$ | $a_{2P3}$ |
| $X_3$ | $a_{3P0}$ | $a_{3P1}$ | $a_{3P2}$ | $a_{3P3}$ | in which $X_0$, $X_1$, $X_2$ and $X_3$ are transpositions of 128 bit plaintext blocks $P_0$, $P_1$, $P_2$, $P_3$.

The method may then proceed to block 404, wherein an ith round of SMS4 may be initiated. Initiation of the ith round may include executing the initial XOR functions of SMS4 on a transposed input block $X_{0...3}$ (transposed data). The output of this initial XOR may be in the form of a first representation (REP1) of $GF(2)^8$, as described above in connection with block 303 of FIG. 3.

At this point the method may proceed to block 405, wherein the first representation of $GF(2)^8$ (REP1) may be converted to a second representation of $GF(2)^8$ (i.e., REP2) that is suitable for use in AES. Consistent with the foregoing description the conversion of REP1 to REP2 may be performed applying function (VIII) above to REP1. The output of function (VIII) is REP2 containing the elements of the relevant transposed input data block $X_{0...1}$.

The method may then proceed to block 406, wherein one or more isolated AES operations may be performed on the data elements of REP2. In some embodiments, the isolated AES operations may include an isolated AES S-box and/or inverse S-Box operation. Performance of the isolated AES S-Box may be accomplished by executing a PSHUFB instruction on elements of REP2 stored in an xmm register (e.g. xmm0), followed by executing an AESENCLAST instruction on the output of the PSHUFB instruction. In contrast if P is cipher text, an isolated AES inverse S-box may performed by executing a PSHUFB instruction on elements of REP2 stored in an xmm register, followed by executing an AESDECLAST instruction on the output of the instruction. In either case the result will be a third representation of $GF(2)^8$ (REP3), which is identical to REP2 except insofar as its elements are the output of the isolated AES S-box and/or inverse S-Box operations.

The method may then proceed to optional block 407, wherein an inverse transposition operation may be performed on the elements of REP3. If performed at this time, the inverse transposition operation may be the inverse of the transposition operation performed pursuant to block 403. As explained above the inverse transposition operation may rearrange the elements of REP3, such that when REP3 is transformed back to the representation of $GF(2)^8$ used in SMS4, the resulting output is the same as what would have been produced by execution of the SMS4 S-box and/or inverse S-box operations on the elements of REP1.

Whether or not the inverse transposition operation is performed pursuant to optional block 407 the method may proceed to block 408, wherein the third representation of $GF(2)^8$ (REP3) may be converted to a fourth representation of $GF(2)^8$ (i.e., REP4) that is suitable for use in SMS4. Consistent with the foregoing description the conversion of REP3 to REP4 may be performed using function (IX) above. The output of function (IX) is REP4 containing the elements of output of the isolated AES S-box and/or S-Box operations.

If an inverse transposition operation was performed pursuant to block 407, the elements of REP4 will be identical to the elements in the representation of $GF(2)^8$ that would have been produced by the execution of the SMS4 S-Box and/or inverse S-box operations on the elements of REP1. In other words, the execution of the AES S-Box and/or inverse S-Box on REP2 and subsequent conversions consistent with the above described methodology may produce the same output as the execution of the SMS4 S-box and/or inverse S-box operations on the elements of REP1.

Alternatively if an inverse transposition operation was not performed pursuant to block 407 above, the method may proceed to optional block 409, wherein an inverse transposition operation may be executed on the elements of REP4. Like the operation described above in connection with optional block 407, the inverse transposition operation executed pursuant to block 409 may be the inverse of the transposition operation performed pursuant to block 403. As may be appreciated, the inverse transposition operation may rearrange the elements of REP4, such that they are identical to the output that would have been produced by execution of the SMS4 S-box and/or inverse S-box operations on the elements of REP1

The method may then proceed to block 410, wherein additional operations of the SMS4 cipher may be performed. Such operations may include the linear transformation (L) and final exclusive or (XOR) operations described in the SMSR specification.

The method may then proceed to block 411, wherein a determination may be made as to whether another round of the modified cipher is to be performed. In some embodiments this determined may be based on the identity of the current round, versus the number of rounds specified in the SMS4 cipher. If another round is to be performed, the method may loop back to block 404 and repeat. Alternative if the current round is the last round of SMS4, the method may proceed to block 412 and end.

For the purpose of clarity, the present disclosure will now describe a specific example of the method of FIG. 4, as applied to one of four 16 byte (128 bit) plaintext blocks, $P_0$, $P_1$, $P_2$, $P_3$ in a round of a modified SMS4 cipher consistent with the present disclosure. In this example, $P_0$, $P_1$, $P_2$, and $P_3$ were provided (e.g., in an xmm register) pursuant to block 402 as follows:

$P_0$: 0x00000000 0x00000001 0x00000002 0x00000003
$P_1$: 0x00000004 0x00000005 0x00000006 0x00000007
$P_2$: 0x00000008 0x00000009 0x0000000a 0x0000000b
$P_3$: 0x0000000c 0x0000000d 0x0000000e 0x0000000f

Pursuant to block 403, in this example a transposition operation was performed on $P_{0...3}$ to produce transposed input blocks $X_0, X_1, X_2, X_3$, as shown below:

$X_0$: 0x00000000 0x00000004 0x00000008 0x0000000c
$X_1$: 0x00000001 0x00000005 0x00000009 0x0000000d
$X_2$: 0x00000002 0x00000006 0x0000000a 0x0000000e
$X_3$: 0x00000003 0x00000007 0x0000000b 0x0000000f

Pursuant to block 404, the SMS4 algorithm was initiated, and the initial XOR operations identified in the SMS4 were performed on $X_0$ using the round key RK defined below:

RK=0xf12186f9 0xf12186f9 0xf12186f9 0xf12186f9

The output of the initial XORs was as follows:

0xf12186f9 0xf12186fd 0xf12186f1 0xf12186f5

The output of the initial XORs was presented in a first representation of $GF(2)^8$ (REP1).

Pursuant to block 404 the output of the initial XORs of SMS4 (i.e., REP1) was converted to a second representation of $GF(2)^8$ suitable for use in AES (i.e., REP2) using a first affine transformation defined above as equation (VIII) above (i.e., $y=\text{Affine1}(x)=M(A_1 \cdot x + C_1)$). In this example, $M \cdot C_1$ was 0x65 and $M \cdot A_1$ was as follows:

$$M \cdot A_1 =$$

01010010
10111100
00101101
00000010
10011110
00100101
10101100
00110100

The output of the first affine transformation was as follows:

0x2526d84f 0x2526d820 0x2526d825 0x2526d84a.

The output of the first affine transformation was in a second representation of $GF(2)^8$ suitable for use in AES (i.e., REP2).

Pursuant to block 406, in this example an isolated AES S-Box transformation was performed by executing an AES-ENCLAST with a round key (RK) on the elements of REP2, followed by a PSHUFB instruction employing a mask. The RK, AESENCLAST Output, PSHUFB mask, and respective outputs of the AESENCLAST instruction and the PSHUFB instruction were as follows:

RK=0x63636363 0x63636363 0x63636363 0x63636363
Aesenclast Output=0x5c9402e7 0x5c9402d4 0x5c94025c 0x5c9402b5
Mask=0x070a0d00 0x0b0e0104 0x0f020508 0x0306090c
PSHUFB Output=0x5c9402e7 0x5c9402d4 0x5c94025c 0x5c9402b5

The PSHUFB output was in a third representation of $GF(2)^8$ (i.e., REP3) that was identical to REP2, except insofar as its elements were the output of the combined AESENCLAST and PSHUFB operations.

Pursuant to block 408, the elements of REP3 were transformed into a fourth representation of $GF(2)^8$ (i.e., REP4), where REP4 is suitable for use in additional operations of SMS4. The conversion of REP3 to REP4 was performed using a second affine transformation as defined above in function (IX), $s=\text{Affine2}(u)=A_2 \cdot (M^{-1} \cdot A^{-1} \cdot u) + C_2$, wherein $A_2$, $M^{-1}$, $A^{-1}$ and $C_2$ are as defined previously, and u is an element of REP3. In this specific example, $A_2 * M^{-1} * A^{-1}$ was:

11001011
10011010
00001010
10110100
11000111
10101100
10000111
01001110 and $C_2$ was 0xd3.

The output of the second affine transformation was:

0xd34011bb 0x682b7000 0x3bd7d523 0xbae6d61c which was presented in REP4. Pursuant to block 409, a reverse transposition operation was applied to the elements of REP4, so as to reverse the transposition applied to REP1 above.

The resulting output (REP4 containing transposed elements) was then subject to the linear transformation L and final XOR operations specified in SMS4. The output of the linear transformation L was:

0x34e2e3a4 0x11767715 0x2a9a9bc2 0x062a2b5e

The output of the final XOR was:

0x34e2e3a4 0x11767711 0x2a9a9bca 0x062a2b52 which was identical to the output of the execution of an unmodified SMS4 cipher on $P_0$. The foregoing process was repeated using transposed input blocks $X_1, X_2,$ and $X_3$, and the collective output of the operations on $P_{0...3}$ was identical to the execution of an unmodified SMS4 cipher on $P_{0...3}$.

The above example was executed on multiple different types of general purpose processors and its performance was compared to the performance of the SMS4 cipher in accordance with the SMS4 specification on the same input and on the processors. Specifically, the number of cycles per byte (C/B) required to execute the modified cipher and the unmodified SMS4 cipher on the same input and the same processor was compared. In general it was observed that the modified cipher exhibited better performance than the unmodified SMS4 cipher on all tested processors. Specifically, execution of the modified cipher required from about 20 to about 70% less C/B than execution of the unmodified SMS4 cipher on the same input, depending on the processor employed. In some embodiments the modified cipher required from about 25 to about 70% less C/B, about 30 to about 70% less C/B, about 40 to about 70% less C/B, or even about 50 to about 70% less C/B than the execution of the unmodified SMS4 cipher on the same input.

Put in other terms, it was observed that execution of the modified cipher on a general purpose processor was about 30 to about 315% faster than execution of the unmodified SMS4 cipher on the same state, depending on the processor employed. In some embodiments, the modified cipher executed on a processor from about 36 to about 312% faster, such as about 80 to about 312% faster, or even about 200 to about 312% faster than the execution of the SMS4 cipher on the same input.

In addition to improving performance, it is believed that the modified SMS4 cipher described above will be less susceptible to certain types of attack, relative to the unmodified SMS4 cipher. Indeed, unlike the SMS$ cipher, the modified SMS4 cipher does not rely on a lookup table for the performance of S-box operations. Consistent with the foregoing discussion, the modified SMS4 cipher may therefore be hardened against certain types of attacks that may target or otherwise benefit from a lookup table, such as but not limited to side channel attacks.

Embodiments of the methods described herein may be implemented in an apparatus (e.g. a computing device) that includes one or more computer readable storage mediums having stored thereon, individually or in combination, instructions that when executed by one or more processors perform the methods described herein. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a sub combination, as would be understood by one skilled in the art. Thus, not all of the operations of each of the flow charts need to be performed, and the present disclosure expressly intends that all sub combinations of such operations are enabled as would be understood by one of ordinary skill in the art.

The computer readable storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

Figure 5:
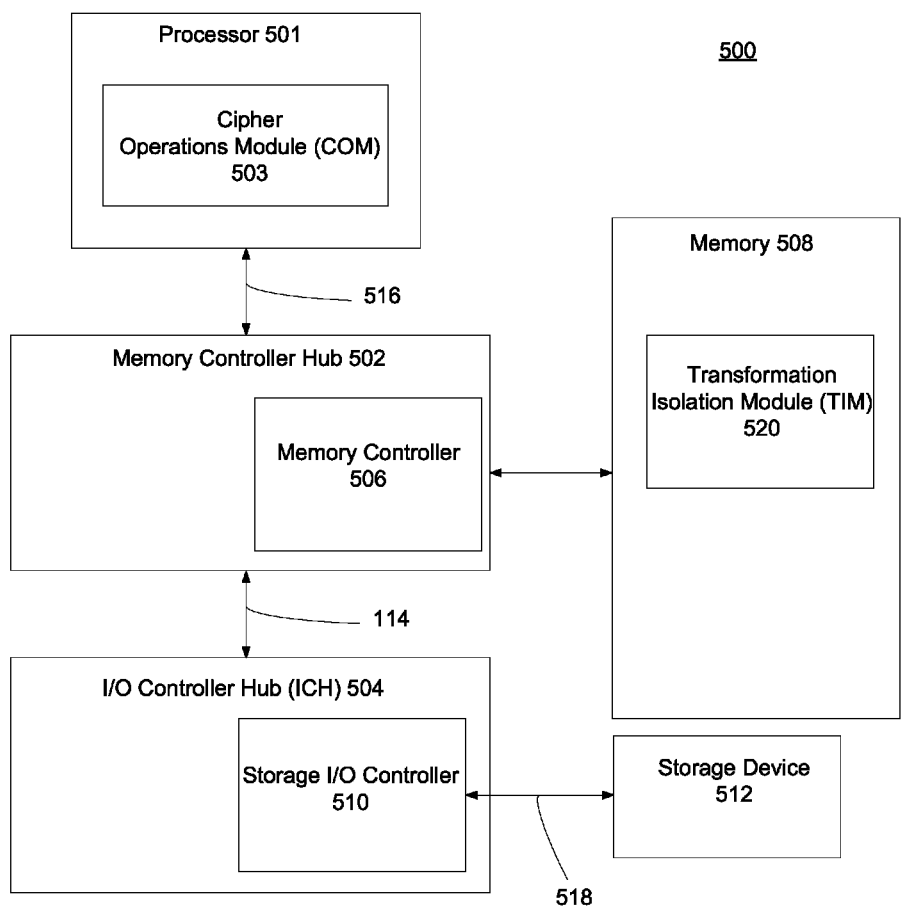
FIG. 5 is a block diagram of one example of an apparatus consistent with the present disclosure.

Another aspect of the present disclosure relates to apparatus for executing a modified cryptographic cipher and/or methods of modifying a cryptographic cipher, such as those described above. Reference is therefore made to FIG. 5, which is a block diagram of an example apparatus consistent with the present disclosure.

As shown, apparatus 500 includes FIG. 1 is a block diagram of a system 100 that includes instructions for performing encryption and decryption with general purpose processor using a modified cipher (or method of modifying a cipher) consistent with the present disclosure. Apparatus 500 includes processor 501, a Memory Controller Hub (MCH) or (Graphics Memory Controller Hub (GMCH)) 502 and an Input/Output (I/O) Controller Hub (ICH) 504. The MCH 502 includes a memory controller 506 that controls communication between the processor 501 and memory 508. The processor 501 and MCH 502 communicate over a system bus 516.

Processor 501 may be any suitable single or multi-core general purpose processor or combination of processors. Processor 501 may therefore include one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include but are not limited to various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc.

Memory 508 may be any suitable type of computer readable memory. For example, Memory 508 may include one or more of the following types of memory: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Additionally or alternatively, memory 508 may include other and/or later-developed types of computer-readable memory. In some embodiments, memory 508 may be local to processor 501 or to another component of apparatus 501, such as but not limited to a storage device 512.

ICH 504 may be coupled to the MCH 502 using a high speed chip-to-chip interconnect 514 such as Direct Media Interface (DMI). ICH 104 may include for example a storage I/O controller 510 for controlling communication with at least one storage device 512 coupled to the ICH 504. Storage device 512 may be, for example, a disk drive, Digital Video Disk (DVD) drive, Compact Disk (CD) drive, one or more hard drives, tape drive or other storage device. ICH 504 may communicate with the storage device 512 over a storage protocol interconnect 518 using a serial storage protocol such as, Serial Attached Small Computer System Interface (SAS) or Serial Advanced Technology Attachment (SATA).

As shown, processor 501 may include cipher operations module (COM) 503. In general COM 503 may include instructions which when executed cause processor 501 (or, more generally, apparatus 500) to execute a modified cryptographic cipher consistent with the present disclosure. Accordingly, COM 503 may include computer readable instructions which when executed cause processor 501 and/or apparatus 500 to: initiate execution of a first cryptographic algorithm to produce a first representation of GF(2)8; converter REP1 to a second representation of GF(2)8, REP2; perform one or more isolated operations of a second cryptographic cipher on elements of REP2 to produce a third representation of GF(2)8; convert. REP3 to a fourth representation of GF(2)8, REP4; and optionally perform one or more additional operations of the first cryptographic cipher on the elements of REP4. Put in other terms, COM 503 may include computer readable instructions which when executed cause processor 501 and/or apparatus 500 to perform one or more operations of the methods described herein, including but not limited to the method operations discussed above in connection with FIG. 4. In any case, the output of the modified cipher may be stored in any suitable location of apparatus 500, such as within memory local to processor 501, memory 508, and/or memory within storage device 512.

As noted above, the methods described herein can modify a first cryptographic cipher by replacing one or more operations of the first cryptographic cipher with isolated AES operations, such as the AES S-box operations. Instructions for isolating AES operations in some embodiments may be included in COM 503. Alternatively or additionally, instructions for isolating AES operations may be stored elsewhere. This concept is illustrated in FIG. 5, which depicts memory 508 as including a transformation isolation module (TIM) 520. Consistent with the foregoing instructions, TIM 520 may include instructions which when executed cause processor 501 (or, more generally, apparatus 500) to isolate one or more AES operations for use in conjunction with the execution of a modified cryptographic cipher, as described above.

The following examples pertain to additional embodiments of the present disclosure.

EXAMPLES

Example 1

According to this example there is provided a method of executing a modified cryptographic cipher, including, with a processor: executing a portion of operations of a first cryptographic cipher to produce a first representation of $GF(2)^8$, REP1, wherein REP1 contains first data and is suitable for use in at least one operation of the first cryptographic cipher; transforming REP1 to a second representation of $GF(2)^8$, REP2, wherein REP2 contains the first data and is suitable for use in at least one operation of a second cryptographic cipher; performing at least one isolated operation of the second cryptographic cipher using at least a portion of the first data in REP2 to produce a third representation of $GF(2)^8$, REP3, wherein REP3 contains second data that is the output of the at least one isolated operation on the first data; and transforming REP3 to a fourth representation of $GF(2)^8$, REP4, wherein REP4 contains the second data and is suitable for use in at least one additional operation of the first cryptographic cipher.

Example 2

This example includes any or all of the features of example 1, and further includes executing, after REP3 is transformed to REP4, at least one additional operation of the first cipher on at least a portion of the second data in REP4.

Example 3

This example includes any or all of the features of example 1, wherein the first cryptographic cipher is a first block cipher and the second cryptographic cipher is a second block cipher Example 4

This example includes any or all of the features of example 1, wherein the first cryptographic cipher is SMS4.

Example 5

This example includes any or all of the features of example 1, wherein the second cryptographic cipher is the Advanced Encryption Standard.

Example 6

This example includes any or all of the features of example 4, wherein the second cryptographic cipher is the Advanced Encryption Standard.

Example 7

This example includes any or all of the features of example 1, and further includes prior to executing the portion of operations to produce REP1, transposing the first data to produce transposed data; and performing the portion of operations on at least a portion of the transposed data to produce REP1.

Example 8

This example includes any or all of the features of example 1, wherein transforming REP1 to REP2 is performed at least in part with a first affine transformation.

Example 9

This example includes any or all of the features of example 1, wherein transforming REP3 to REP4 is performed at least in part with a second affine transformation.

Example 10

This example includes any or all of the features of example 9, wherein the first affine transformation is based at least in part on a mapping matrix.

Example 11

This example includes any or all of the features of example 10, wherein the second affine transformation is based at least in part on an inverse of the mapping matrix.

Example 12

This example includes any or all of the features of example 6, wherein performing at least one cryptographic operation of the second cryptographic cipher comprises, with the processor, executing a combination of Advanced Encryption Standard instructions on at least a portion of the first data in REP2.

Example 13

This example includes any or all of the features of example 12, wherein executing a combination of Advanced Encryption Standard instructions includes executing at least one of an Advanced Encryption Standard Encrypt Last (AESENCLAST) instruction and an Advanced Encryption Standard Decrypt Last (AESENDECLAST) instruction.

Example 14

This example includes any or all of the features of example 13, wherein executing a combination of Advanced Encryption Standard instructions includes executing at least the AESENCLAST instruction, the AESENCLAST instruction including a Shift Rows transformation and a Substitute Bytes transformation.

Example 15

This example includes any or all of the features of example 14, and further includes: executing an Inverse Shift Rows operation after execution of the AESENCLAST instruction and prior to transforming REP3 to REP4.

Example 16

This example includes any or all of the features of example 6, wherein executing a portion of the operations of the first cipher to produce REP1 includes executing at least one exclusive or (XOR) operation on input data.

Example 17

This example includes any or all of the features of example 2, wherein the at least one additional operation of the first cryptographic cipher includes performing a linear transformation of at least a portion of the data in REP4.

Example 18

According to this example there is provided at least one computer readable medium including computer readable instructions which when executed by a processor cause the processor to perform the following operations including: execute a portion of operations of a first cryptographic cipher to produce a first representation of $GF(2)^8$, REP1, wherein REP1 contains first data and is suitable for use in at least one operation of the first cryptographic cipher; transform REP1 to a second representation of $GF(2)^8$, REP2, REP2 containing the first data and being suitable for use in at least one operation of a second cryptographic cipher; perform at least one cryptographic operation of the second cryptographic cipher using at least a portion of the first data in REP2 to produce a third representation of $GF(2)^8$, REP3, REP3 containing second data that is the output of the at least one cryptographic operation of the second cryptographic cipher; and transform REP3 to a fourth representation of $GF(2)^8$, REP4, wherein REP4 contains the second data and is suitable for use in at least one additional operation of the first cryptographic cipher.

Example 19

This example includes any or all of the features of example 18, wherein the instructions when executed cause the processor to perform the following additional operations including: after REP3 is transformed to REP4, execute at least one additional operation of the first cipher on at least a portion of the second data in REP4.

Example 20

This example includes any or all of the features of example 18, wherein the first cryptographic cipher is a first block cipher and the second cryptographic cipher is a second block cipher.

Example 21

This example includes any or all of the features of example 18, wherein the first cryptographic cipher is SMS4.

Example 22

This example includes any or all of the features of example 18, wherein the second cryptographic cipher is the Advanced Encryption Standard.

Example 23

This example includes any or all of the features of example 21, wherein the second cryptographic cipher is the Advanced Encryption Standard.

Example 24

This example includes any or all of the features of example 23, wherein the instructions when executed cause the processor to perform the following additional operations including: prior to executing the portion of operations to produce REP1, transpose the first data to produce transposed data; and perform the portion of operations to produce REP1 on at least a portion of the transposed data.

Example 25

This example includes any or all of the features of example 23, wherein the instructions when executed further cause the processor to transform REP1 to REP2 at least in part with a first affine transformation.

Example 26

This example includes any or all of the features of example 25, wherein the instructions when executed further cause the processor to transform REP3 to REP4 at least in part with a second affine transformation.

Example 27

This example includes any or all of the features of example 26, wherein the first affine transformation is based at least in part on a mapping matrix.

Example 28

This example includes any or all of the features of example 27, wherein the second affine transformation is based at least in part on an inverse of the mapping matrix.

Example 29

This example includes any or all of the features of example 23, wherein the instructions when executed cause the processor to perform the at least one cryptographic operation of the second cryptographic cipher at least in part by executing a combination of Advanced Encryption Standard instructions on at least a portion of the first data in REP2.

Example 30

This example includes any or all of the features of example 29, wherein the instructions when executed cause the processor to execute the combination of Advanced Encryption Standard instructions at least in part by executing at least one of an Advanced Encryption Standard Encrypt Last (AESENCLAST) instruction and an Advanced Encryption Standard Decrypt Last (AESENDECLAST) instruction.

Example 31

This example includes any or all of the features of example 30, wherein the instructions when executed cause the processor to execute the combination of Advanced Encryption Standard instructions at least in part by executing the AESENCLAST instruction, the AESENCLAST instruction including a Shift Rows transformation and a Substitute Bytes transformation.

Example 32

This example includes any or all of the features of example 31, wherein prior to transforming REP3 to REP4, the instructions when executed cause the processor to execute an Inverse Shift Rows operation after execution of the AESENCLAST instruction.

Example 33

This example includes any or all of the features of example 23, wherein the execute a portion of operations of a first cryptographic cipher to produce a first representation of $GF(2)^8$ includes performing at least one exclusive or (XOR) operation on input data.

Example 34

This example includes any or all of the features of example 24, wherein the at least one additional operation of the first cryptographic cipher includes performing a linear transformation of at least a portion of the second data in the fourth representation.

Example 35

According to this example there is provided an apparatus, including: a processor; and a memory having a cipher operations module stored thereon, the cipher operations module including computer readable COM instructions for a modified cryptographic cipher on the processor, wherein the COM instructions when executed by the processor cause the processor to: execute a portion of operations of a first cryptographic cipher to produce a first representation of $GF(2)^8$, REP1, wherein REP1 contains first data and is suitable for use in at least one operation of the first cryptographic cipher; transform REP1 to a second representation of $GF(2)^8$, REP2, REP2 containing the first data and being suitable for use in at least one operation of a second cryptographic cipher; perform at least one cryptographic operation of the second cryptographic cipher using at least a portion of the first data in REP2 to produce a third representation of $GF(2)^8$, REP3, wherein REP3 contains second data that is the output of the at least one cryptographic operation of the second cryptographic cipher; and transform REP3 to a fourth representation of $GF(2)^8$, REP4, wherein REP4 contains the second data and is suitable for use in at least one additional operation of the first cryptographic cipher.

Example 36

This example includes any or all of the features of example 35, wherein the COM instructions when executed cause the processor to perform the following additional operations including: after REP3 is transformed to REP4, execute at least one additional operation of the first cipher on at least a portion of the second data in REP4.

Example 37

This example includes any or all of the features of example 35, wherein the first cryptographic cipher is a first block cipher and the second cryptographic cipher is a second block cipher.

Example 38

This example includes any or all of the features of example 35, wherein the first cryptographic cipher is SMS4.

Example 39

This example includes any or all of the features of example 35, wherein the second cryptographic cipher is the Advanced Encryption Standard.

Example 40

This example includes any or all of the features of example 38, wherein the second cryptographic cipher is the Advanced Encryption Standard.

Example 41

This example includes any or all of the features of example 40, wherein the COM instructions when executed cause the processor to perform the following additional operations including: prior to executing the portion of operations to produce REP1, transpose the first data to produce transposed data; and perform the portion of operations to produce REP1 on at least a portion of the transposed data.

Example 42

This example includes any or all of the features of example 40, wherein the COM instructions when executed further cause the processor to transform REP1 to REP2 at least in part with a first affine transformation.

Example 43

This example includes any or all of the features of example 42, wherein the COM instructions when executed further cause the processor to transform REP3 to REP4 at least in part with a second affine transformation.

Example 44

This example includes any or all of the features of example 43, wherein the first affine transformation is based at least in part on a mapping matrix.

Example 45

This example includes any or all of the features of example 44, wherein the second affine transformation is based at least in part on an inverse of the mapping matrix.

Example 46

This example includes any or all of the features of example 40, wherein the COM instructions when executed cause the processor to perform the at least one cryptographic operation of the second cryptographic cipher at least in part by executing a combination of Advanced Encryption Standard instructions on at least a portion of the first data in REP2.

Example 47

This example includes any or all of the features of example 46, wherein the COM instructions when executed cause the processor to execute the combination of Advanced Encryption Standard instructions at least in part by executing at least one of an Advanced Encryption Standard Encrypt Last (AESENCLAST) instruction and an Advanced Encryption Standard Decrypt Last (AESENDECLAST) instruction.

Example 48

This example includes any or all of the features of example 40, wherein the COM instructions when executed cause the processor to execute the combination of Advanced Encryption Standard instructions at least in part by executing the AESENCLAST instruction, the AESENCLAST instruction including a Shift Rows transformation and a Substitute Bytes transformation.

Example 49

This example includes any or all of the features of example 48, wherein the COM instructions when executed cause the processor to execute an Inverse Shift Rows operation after execution of the AESENCLAST instruction and prior to transforming the third representation to the fourth representation.

Example 50

This example includes any or all of the features of example 40, wherein the execute a portion of operations of a first cryptographic cipher to produce a first representation of $GF(2)^8$ includes performing at least one exclusive or (XOR) operation on input data.

Example 51

This example includes any or all of the features of example 41, wherein the at least one additional operation of the first cryptographic cipher includes performing a linear transformation of at least a portion of the second data in REP4.

Example 51

According to this example there is provided a computer readable medium including instructions for executing a modified cryptographic cipher, wherein said instructions when executed by a processor cause the performance of the method of any one of examples 1 to 17.

Example 52

According to this example there is provided an apparatus including a processor and a memory having computer readable instructions for executing a modified cryptographic cipher stored thereon, wherein the instructions when executed by the processor cause the performance of the method of any one of examples 1 to 17.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A computer implemented method for accelerating the computation of an SMS4 cryptographic result on a processor of a computing device, comprising:
executing, with cipher operations circuitry, instructions to cause said processor to execute a portion of operations of an SMS4 cryptographic cipher on an input stored in a memory register of said processor so as to produce a first representation of $GF(2)^8$, REP1, wherein REP1 contains first data and is suitable for use in at least one operation of said SMS4 cryptographic cipher;
storing, with the cipher operations circuitry, REP1 in at least one memory register of said processor;
executing, with the cipher operations circuitry, instructions to cause said processor to transform REP1 to a second representation of $GF(2)^8$, REP2, wherein REP2 contains said first data and is suitable for use in at least one operation of an advanced encryption standard (AES) cryptographic cipher;
storing, with the cipher operations circuitry, REP2 in at least one memory register of said processor;
executing, with the cipher operations circuitry, instructions to cause said processor to perform at least one isolated operation of said AES cryptographic cipher using at least a portion of said first data in REP2 to produce a third representation of $GF(2)^8$, REP3, wherein REP3 contains second data that is the output of said at least one isolated operation of said AES cryptographic cipher on said first data;
storing, with the cipher operations circuitry, REP3 in at least one memory register of said processor;
executing, with the cipher operations circuitry, instructions to cause said processor to transform REP3 to a fourth representation of $GF(2)^8$, REP4, wherein REP4 contains said second data and is suitable for use in at least one additional operation of the first cryptographic cipher; and
storing, with the cipher operations circuitry, REP4 in at least one memory register of said processor.

2. The computer implemented method of claim 1, further comprising executing, after REP3 is transformed to REP4, processor instructions to cause said processor to execute at least one additional operation of said SMS4 cryptographic cipher on at least a portion of said second data in REP4, wherein the at least one additional operation comprises performing a linear transformation of at least a portion of said data in REP4, and storing the result in at least one memory register of said processor.

3. The computer implemented method of claim 1, wherein said at least one memory register comprises an xmm register.

4. The computer implemented method of claim 3, further comprising:
prior to executing said at least one operation to produce REP1, executing processor instructions to cause said processor to transpose said first data to produce transposed data; and
executing processor instructions to cause said processor to perform said at least one operation of said SMS4 cryptographic cipher on at least a portion of said transposed data to produce REP1.

5. The computer implemented method of claim 3, wherein said processor instructions cause said processor to transform REP1 to REP2 at least in part with a first affine transformation, and the first affine transformation is based at least in part on a mapping matrix.

6. The computer implemented method of claim 5, wherein said processor instructions cause said processor to transform REP3 to REP4 at least in part with a second affine transformation, and the second affine transformation is based at least in part on an inverse of said mapping matrix.

7. The computer implemented method of claim 3, wherein executing said processor instructions to cause said processor to perform at least one isolated operation of said AES cryptographic cipher cause said processor to execute a combination of AES instructions on at least a portion of the first data in REP2, the combination of AES instructions comprising at least an AES Encrypt Last (AESENCLAST) instruction that comprises a Shift Rows transformation and a Substitute Bytes transformation.

8. The computer implemented method of claim 7, further comprising:

executing processor instructions to cause said processor to perform an Inverse Shift Rows operation after execution of said AESENCLAST instruction and prior to transforming REP3 to REP4.

9. At least one non-transitory computer readable medium comprising computer readable processor instructions for accelerating the computation of an SMS4 cryptographic result on a processor of a computing device, wherein said processor instructions when executed by said processor cause the processor to perform the following operations comprising:
   execute, with cipher operations circuitry, a portion of operations of an SMS4 cryptographic cipher on an input stored in a memory register of said processor, so as to produce a first representation of $GF(2)^8$, REP1, wherein REP1 contains first data and is suitable for use in at least one operation of said SMS4 cryptographic cipher;
   store, with the cipher operations circuitry, REP1 in at least one memory register of said processor;
   transform, with the cipher operations circuitry, REP1 to a second representation of $GF(2)^8$, REP2, REP2 containing said first data and being suitable for use in at least one operation of an advanced encryption standard (AES) cryptographic cipher;
   store, with the cipher operations circuitry, REP2 in at least one memory register of said processor;
   perform, with the cipher operations circuitry, at least one cryptographic operation of said AES cryptographic cipher using at least a portion of said first data in REP2 to produce a third representation of $GF(2)^8$, REP3, REP3 containing second data that is the output of said at least one cryptographic operation of said AES cryptographic cipher on said first data;
   store, with the cipher operations circuitry, REP3 in at least one memory register of said processor;
   transform, with the cipher operations circuitry, REP3 to a fourth representation of $GF(2)^8$, REP4, wherein REP4 contains said second data and is suitable for use in at least one additional operation of the SMS4 cryptographic cipher; and
   store, with the cipher operations circuitry, REP4 in at least one memory register of said processor.

10. The at least one non-transitory computer readable medium of claim 9, wherein said processor instructions when executed cause said processor to perform the following additional operations comprising:
   after REP3 is transformed to REP4, execute at least one additional operation of said SMS4 cryptographic cipher on at least a portion of said second data in REP4, wherein said at least one additional operation of said SMS4 cryptographic cipher comprises performing a linear transformation of at least a portion of said second data in REP4, and storing the result in at least one memory register of said processor.

11. The at least one non-transitory computer readable medium of claim 9, wherein said at least one memory register comprises an xmm register of said processor.

12. The at least one non-transitory computer readable medium of claim 11, wherein said processor instructions when executed cause said processor to perform the following additional operations comprising:
   prior to executing said at least one operation to produce REP1, transpose said first data to produce transposed data; and
   perform said at least one operation of said SMS4 cryptographic cipher to produce REP1 on at least a portion of said transposed data.

13. The at least one non-transitory computer readable medium of claim 11, wherein said processor instructions when executed further cause said processor to transform REP1 to REP2 at least in part with a first affine transformation, and the first affine transformation is based at least in part on a mapping matrix.

14. The at least one non-transitory computer readable medium of claim 13, wherein said processor instructions when executed further cause said processor to transform REP3 to REP4 at least in part with a second affine transformation, and the second affine transformation is based at least in part on an inverse of said mapping matrix.

15. The at least one non-transitory computer readable medium of claim 14, wherein said processor instructions when executed cause said processor to perform said at least one cryptographic operation of said AES cryptographic cipher at least in part by executing a combination of AES instructions on at least a portion of the first data in REP2, the combination of AES instructions comprising at least an AES Encrypt Last (AESENCLAST) instruction that comprises a Shift Rows transformation and a Substitute Bytes transformation.

16. The at least one non-transitory computer readable medium of claim 15, wherein said processor instructions when executed cause said processor to execute an Inverse Shift Rows operation after execution of said AESENCLAST instruction and prior to transforming REP3 to REP4.

17. A computing device, comprising:
   cipher operations circuitry;
   a processor; and
   a memory having stored thereon computer readable processor instructions for executing a modified SMS4 cryptographic cipher with the processor, wherein said processor instructions when executed by said processor cause said processor to:
   execute, with the cipher operations circuitry, a portion of operations of an SMS4 cryptographic cipher on an input stored in a memory register of said processor so as to produce a first representation of $GF(2)^8$, REP1, wherein REP1 contains first data and is suitable for use in at least one operation of said SMS4 cryptographic cipher;
   store, with the cipher operations circuitry, REP1 in at least one memory register of said processor;
   transform, with the cipher operations circuitry, REP1 to a second representation of $GF(2)^8$, REP2, REP2 containing said first data and being suitable for use in at least one operation of an advanced encryption standard (AES) cryptographic cipher;
   store, with the cipher operations circuitry, REP2 in at least one memory register of said processor;
   perform, with the cipher operations circuitry, at least one cryptographic operation of said AES cryptographic cipher using at least a portion of said first data in REP2 to produce a third representation of $GF(2)^8$, REP3, wherein REP3 contains second data that is the output of said at least one cryptographic operation of said AES cryptographic cipher;
   store, with the cipher operations circuitry, REP3 in at least one memory register of said processor;
   transform, with the cipher operations circuitry, REP3 to a fourth representation of $GF(2)^8$, REP4, wherein REP4 contains said second data and is suitable for use in at least one additional operation of the SMS4 cryptographic cipher; and store, with the cipher operations circuitry, REP4 in at least one memory register of said processor.

18. The computing device of claim 17, wherein said processor instructions when executed cause said processor to perform the following additional operations comprising:

after REP3 is transformed to REP4, execute at least one additional operation of said SMS4 cryptographic cipher on at least a portion of said second data in REP4, wherein the at least one additional operation comprises performing a linear transformation of at least a portion of said data in REP4 and storing the resulting at least one memory register of said processor.

19. The computing device of claim 17, wherein said at least one memory register comprises an xmm register.

20. The computing device of claim 19, wherein said processor instructions when executed cause said processor to perform the following additional operations comprising:

prior to executing said at least one operation of said SMS4 cryptographic cypher to produce REP1, transpose said first data to produce transposed data; and perform said at least one operation of said SMS4 cryptographic cypher on at least a portion of said transposed data to produce REP1.

21. The computing device of claim 19, wherein said processor instructions when executed further cause said processor to transform REP1 to REP2 at least in part with a first affine transformation, and the first affine transformation is based at least in part on a mapping matrix.

22. The computing device of claim 21, wherein said processor instructions when executed further cause said processor to transform REP3 to REP4 at least in part with a second affine transformation, and the second affine transformation is based at least in part on an inverse of said mapping matrix.

23. The computing device of claim 19, wherein said processor instructions when executed cause said processor to perform said at least one cryptographic operation of said AES cryptographic cipher at least in part by executing a combination of AES instructions on at least a portion of the first data in REP2, the combination of AES instructions comprising at least an AES Encrypt Last (AESENCLAST) instruction that comprises a Shift Rows transformation and a Substitute Bytes transformation.

24. The computing device of claim 23, wherein said processor instructions when executed cause said processor to execute an Inverse Shift Rows operation after execution of said AESENCLAST instruction and prior to transforming REP3 to REP4.

25. The computing device of claim 17, wherein said computer readable processor instructions for executing a modified SMS4 cryptographic cipher are configured to cause said processor to compute a correct SMS4 encryption result using said input faster than the execution of instructions for performing an unmodified SMS4 cryptographic cipher by said processor using said input.

* * * * *